US010778128B2

(12) United States Patent
Goi et al.

(10) Patent No.: US 10,778,128 B2
(45) Date of Patent: Sep. 15, 2020

(54) POWER GENERATION SYSTEM AND METHOD OF CONTROLLING SAME

(71) Applicant: KAWASAKI JUKOGYO KABUSHIKI KAISHA, Kobe-shi, Hyogo (JP)

(72) Inventors: Tatsuhiko Goi, Kobe (JP); Kenichi Nakashima, Kobe (JP); Satoshi Otsuki, Akashi (JP); Kazushige Sugimoto, Amagasaki (JP); Masaaki Higashi, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 0 days.

(21) Appl. No.: 16/473,877

(22) PCT Filed: Dec. 27, 2016

(86) PCT No.: PCT/JP2016/088960
§ 371 (c)(1),
(2) Date: Jun. 26, 2019

(87) PCT Pub. No.: WO2018/122982
PCT Pub. Date: Jul. 5, 2018

(65) Prior Publication Data
US 2019/0348937 A1 Nov. 14, 2019

(51) Int. Cl.
*H02P 9/42* (2006.01)
*H02P 9/10* (2006.01)
(Continued)

(52) U.S. Cl.
CPC ............... *H02P 9/42* (2013.01); *F16H 15/16* (2013.01); *F16H 61/664* (2013.01); *F16H 63/04* (2013.01);
(Continued)

(58) Field of Classification Search
CPC .................................. H02P 9/42; F16H 15/16
(Continued)

(56) References Cited

U.S. PATENT DOCUMENTS 5,791,426 A * 8/1998 Yamada .................... B60K 6/26
180/65.24
5,873,801 A * 2/1999 Taga ........................ B60K 6/26
477/5
(Continued)

FOREIGN PATENT DOCUMENTS

JP 10-178741 A 6/1998
JP 11-103600 A 4/1999
(Continued)

*Primary Examiner* — Pedro J Cuevas
(74) *Attorney, Agent, or Firm* — Sughrue Mion, PLLC

(57) ABSTRACT

A power generation system includes a continuously variable transmission, a power generator, a transmission driving device, an output-side speed detector, and electric power load device, and a controller. The electric power load calculation device detects current values and current values of respective phases of three-phase alternating current generated by the power generator, calculates electric power load of the power generator based on the detected values, and executes filtering by attenuating a higher harmonic of a set frequency when calculating the electric power load of the power generator. The controller executes feedback control of calculating and outputting a gear change command to the transmission driving device so an output-side rotational speed detected by the output-side speed detector becomes equal to an output-side target rotational speed corresponding to the set frequency. The controller also executes feedforward compensation of correcting the gear change command, based on the calculated electric power load.

7 Claims, 10 Drawing Sheets

(51) Int. Cl.
*H02P 101/25* (2016.01)
*H02P 101/30* (2015.01)
*F16H 15/16* (2006.01)
*F16H 61/664* (2006.01)
*F16H 63/04* (2006.01)
*B64D 41/00* (2006.01)
*F16H 59/40* (2006.01)
*F16H 61/00* (2006.01)

(52) U.S. Cl.
CPC .............. *H02P 9/105* (2013.01); *B64D 41/00* (2013.01); *F16H 59/40* (2013.01); *F16H 2061/0012* (2013.01); *F16H 2300/02* (2013.01); *H02P 2101/25* (2015.01); *H02P 2101/30* (2015.01)

(58) Field of Classification Search
USPC .............. 322/18; 180/65.225, 65.23, 65.235, 180/65.24, 65.245, 65.25; 318/139, 376, 318/801; 701/22
See application file for complete search history.

(56) References Cited

U.S. PATENT DOCUMENTS

| | | | | |
|---|---|---|---|---|
| 5,905,346 A * | 5/1999 | Yamada | ............... | B60K 6/26 318/50 |
| 5,936,312 A * | 8/1999 | Koide | ............... | B60L 50/15 290/40 R |
| 5,973,460 A * | 10/1999 | Taga | ............... | B60L 7/003 318/139 |
| 5,991,683 A * | 11/1999 | Takaoka | ............... | B60K 6/40 701/102 |
| 6,013,992 A * | 1/2000 | Ishikawa | ............... | B60K 6/485 318/376 |
| 6,041,877 A * | 3/2000 | Yamada | ............... | B60L 50/66 180/65.25 |
| 6,124,690 A * | 9/2000 | Yano | ............... | B60K 6/28 318/376 |
| 6,164,400 A * | 12/2000 | Jankovic | ............... | B60K 6/48 180/65.25 |
| 6,453,222 B1 * | 9/2002 | Lasson | ............... | B60K 6/365 701/22 |
| 6,484,832 B1 * | 11/2002 | Morisawa | ............... | B60K 6/54 180/65.225 |
| 6,512,967 B2 * | 1/2003 | Ostberg | ............... | B60K 6/445 701/22 |
| 6,554,088 B2 * | 4/2003 | Severinsky | ............... | B60K 6/485 180/65.23 |
| 6,651,759 B1 * | 11/2003 | Gruenwald | ............... | B60K 6/28 180/65.245 |
| 6,755,266 B2 * | 6/2004 | Lasson | ............... | B60W 20/10 180/65.235 |
| 6,784,563 B2 * | 8/2004 | Nada | ............... | F02N 11/0859 290/40 C |
| 6,847,189 B2 * | 1/2005 | Frank | ............... | B60L 15/2045 320/104 |
| 6,953,415 B2 * | 10/2005 | Kadota | ............... | B60K 6/44 477/5 |
| 6,962,550 B2 * | 11/2005 | Kadota | ............... | B60K 6/44 477/15 |
| 6,965,824 B2 * | 11/2005 | Ichimoto | ............... | B60W 20/00 701/113 |
| 7,104,347 B2 * | 9/2006 | Severinsky | ............... | B60L 53/20 180/65.23 |
| 7,151,355 B2 * | 12/2006 | Izumi | ............... | B60K 6/442 318/801 |
| 7,157,869 B2 * | 1/2007 | Ishikawa | ............... | B60K 6/44 318/139 |
| 7,237,634 B2 * | 7/2007 | Severinsky | ............... | B60L 58/10 180/65.23 |
| 7,313,470 B2 * | 12/2007 | Zaremba | ............... | B60W 10/10 701/22 |
| 7,317,295 B2 * | 1/2008 | Izumi | ............... | B60L 15/20 318/801 |
| 7,392,871 B2 * | 7/2008 | Severinsky | ............... | B60K 6/442 180/65.28 |
| 7,455,134 B2 * | 11/2008 | Severinsky | ............... | B60T 11/18 180/65.28 |
| 7,495,411 B2 * | 2/2009 | Kaneko | ............... | B60L 50/16 318/801 |
| 7,510,500 B2 * | 3/2009 | Antony | ............... | B60K 6/365 477/3 |
| 7,520,353 B2 * | 4/2009 | Severinsky | ............... | F02D 41/0007 180/65.28 |
| 7,597,164 B2 * | 10/2009 | Severinsky | ............... | B60L 15/2045 180/65.27 |
| 8,008,791 B2 * | 8/2011 | Yamakado | ............... | B60K 6/48 290/4 C |
| 8,712,620 B2 * | 4/2014 | Jackson | ............... | B60L 50/51 701/22 |
| 9,448,135 B2 * | 9/2016 | Syed | ............... | G01L 3/24 |
| 9,712,090 B2 * | 7/2017 | Yamada | ............... | H02M 3/1584 |
| 9,855,858 B2 * | 1/2018 | Li | ............... | B60L 15/025 |
| 10,202,031 B2 * | 2/2019 | Lo | ............... | B60W 30/1888 |
| 2001/0042649 A1 * | 11/2001 | Maeda | ............... | B60K 6/26 180/65.225 |
| 2002/0052677 A1 * | 5/2002 | Lasson | ............... | B60K 6/445 701/22 |
| 2004/0213100 A1 | 10/2004 | Iwashiro | | |
| 2006/0220608 A1 * | 10/2006 | Izumi | ............... | B60L 15/025 318/801 |
| 2007/0096683 A1 * | 5/2007 | Izumi | ............... | B60L 50/16 318/801 |
| 2009/0131215 A1 * | 5/2009 | Shamoto | ............... | B60W 10/08 477/3 |
| 2009/0159348 A1 * | 6/2009 | Oyobe | ............... | H02M 7/48 180/65.21 |
| 2010/0222953 A1 * | 9/2010 | Tang | ............... | B60W 10/08 701/22 |
| 2010/0274427 A1 * | 10/2010 | Ebuchi | ............... | B60W 10/06 701/22 |
| 2011/0074365 A1 | 3/2011 | Nakayama et al. | | |
| 2015/0267380 A1 * | 9/2015 | Kaneko | ............... | B60L 50/61 701/22 |
| 2015/0316621 A1 | 11/2015 | Ieda et al. | | |
| 2018/0022204 A1 * | 1/2018 | Imamura | ............... | B60K 6/445 180/65.235 |
| 2018/0362181 A1 * | 12/2018 | Iwashima | ............... | H02M 7/12 |
| 2019/0097428 A1 * | 3/2019 | Goi | ............... | H02P 9/48 |

FOREIGN PATENT DOCUMENTS

| | | |
|---|---|---|
| JP | 2004-364459 A | 12/2004 |
| JP | 2011-078186 A | 4/2011 |

* cited by examiner

POWER GENERATION SYSTEM AND METHOD OF CONTROLLING SAME

CROSS REFERENCE TO RELATED APPLICATIONS

This application is a National Stage of International Application No. PCT/JP2016/088960 filed Dec. 27, 2016.

TECHNICAL FIELD

The present invention relates to a power generation system configured to generate three-phase AC power of a predetermined set frequency, and a method of controlling the power generation system.

BACKGROUND ART

An aircraft, an automobile, or the like includes a power generation system configured to supply electric power to an electronic device included in the aircraft, the automobile, or the like. A power generating apparatus described in, for example, PTL 1 is known as the power generation system. In the power generating apparatus of PTL 1, a power generator is, for example, an AC power generator and is driven by an engine. The power generator is connected to the engine through a continuously variable transmission. The power generator generates an alternating current of a frequency corresponding to a rotational frequency of the engine and a speed change ratio.

According to such power generating apparatus, the engine and the power generator are coupled to each other through the continuously variable transmission, and the speed change ratio of the continuously variable transmission is controlled by a controller such that an alternating current of a prescribed frequency is generated at an electronic device included in an aircraft, an automobile, or the like regardless of the rotational frequency of the engine. When controlling the speed change ratio, the controller executes feedback control and also executes feedforward control in accordance with a change in electric power load of the power generator. With this, the frequency of the alternating current generated at the power generator falls within a prescribed range.

CITATION LIST

Patent Literature

PTL 1: Japanese Laid-Open Patent Application Publication No. 2004-364459

SUMMARY OF INVENTION

Technical Problem

According to the power generating apparatus of PTL 1, when executing the feedforward control in accordance with the electric power load, the electric power load of the power generator is calculated based on voltages and currents of respective phases of the power generator, and the feedforward control is executed by using the obtained electric power load. The obtained electric power load may contain a higher harmonic of a prescribed frequency due to various factors. Further, excessive correction may be executed in the feedforward control due to the higher harmonic contained in the electric power load. In such a case, the frequency of the alternating current generated at the power generator may not fall within a predetermined range. In order to avoid this kind of situation, the electric power load which does not cause the excessive correction in the feedforward control is desired to be calculated.

An object of the present invention is to provide a power generation system capable of suppressing the occurrence of excessive feedforward compensation, and a method of controlling the power generation system.

Solution to Problem

A power generation system of the present invention includes: a continuously variable transmission including a transmission mechanism configured to steplessly change a speed change ratio, the continuously variable transmission being configured to transmit a rotational speed of an input shaft to an output shaft at the speed change ratio changed by the transmission mechanism; a power generator driven by rotation of the output shaft to generate three-phase AC power; a transmission driving device configured to drive the transmission mechanism such that the speed change ratio of the continuously variable transmission is changed to a commanded gear change value corresponding to an input gear change command; an output-side speed detector configured to detect an output-side rotational speed that is a rotational speed of the output shaft; an electric power load calculation device configured to calculate electric power load of the power generator; and a controller configured to output the gear change command corresponding to a detection result of the output-side speed detector and the electric power load calculated by the electric power load calculation device, control the speed change ratio of the continuously variable transmission, and make the power generator generate the three-phase AC power of a predetermined set frequency. The electric power load calculation device includes a current detector, a voltage detector, and a calculator. The current detector detects current values of respective phases of a three-phase alternating current generated by the power generator. The voltage detector detects voltage values of the respective phases of the three-phase alternating current generated by the power generator. The calculator calculates the electric power load of the power generator based on the current values detected by the current detector and the voltage values detected by the voltage detector, and executes filtering work of attenuating a higher harmonic of the set frequency when calculating the electric power load of the power generator. The controller includes a feedback control portion and a feedforward compensation portion. The feedback control portion executes feedback control of calculating the gear change command and outputting the obtained gear change command to the transmission driving device such that the output-side rotational speed detected by the output-side speed detector becomes equal to an output-side target rotational speed corresponding to the set frequency. The feedforward compensation portion executes feedforward compensation of correcting the gear change command, calculated by the feedback control portion, based on the electric power load of the power generator, the electric power load being calculated by the calculator.

According to the present invention, a high frequency of the electric power load that is disturbance compensated by the feedforward compensation portion is attenuated in advance by the filtering work. With this, the occurrence of the excessive feedforward compensation (i.e., excessive correction) due to the high frequency can be suppressed. With this, the speed change ratio of the continuously variable transmission can be stably controlled.

In the above invention, the power generation system may be configured such that: the calculator includes a pre-filter; and before the electric power load is calculated, the pre-filter executes filtering work of attenuating the higher harmonic of the set frequency with respect to the detected current values of three phases and the detected current values of the three phases.

According to the above configuration, the higher harmonics contained in the current values and voltage values of the respective phases are attenuated by the pre-filter. With this, the higher harmonic can be prevented from appearing in the obtained electric power load.

In the above invention, the power generation system may be configured such that: the calculator includes a post-filter; and the post-filter executes filtering work of attenuating the higher harmonic of the set frequency with respect to the calculated electric power load.

According to the above configuration, when the current values and voltage values of the respective phases are unbalanced due to the formation of an unbalanced circuit by the power generator and load (such as an electrical apparatus) connected to the power generator, the higher harmonic of the set frequency appears in the obtained electric power load. However, since the higher harmonic is attenuated by the post-filter, the higher harmonic can be prevented from appearing in the electric power load.

In the above invention, the power generation system may be configured such that the post-filter includes: a band elimination filter configured to attenuate a second higher harmonic of the set frequency; and a low pass filter configured to attenuate an N-th higher harmonic (N=3, 4, ... ) of the set frequency.

According to the above configuration, the N-th higher harmonic other than the second higher harmonic is attenuated by the low pass filter. With this, as compared to a case where the second higher harmonic is also attenuated by the low pass filter, the influence of the phase shift by the use of the low pass filter can be reduced. Thus, the higher harmonic is prevented from appearing, and the electric power load of a small phase shift can be calculated.

In the above invention, the power generation system may be configured such that: the feedforward compensation portion executes filtering work of converting the electric power load calculated by the electric power load calculation device into a speed value, subjecting the converted electric power load as the speed value to phase compensation through a dead zone filter, and integrating the compensated electric power load; and the feedforward compensation portion corrects the gear change command, calculated by the feedback control portion, by using as a compensation value the electric power load subjected to the filtering work.

According to the above configuration, the filtering work including the conversion into the speed value is executed by the feedforward compensation portion. Therefore, when the high frequency is contained in the electric power load, much noise remains even after the filtering by the dead zone filter, and the excessive compensation may be executed by the feedforward compensation portion. However, according to the present invention, the high frequency is attenuated at the time of the calculation. Therefore, noise can be adequately attenuated from the electric power load as the speed value by the filtering of the dead zone filter of the feedforward compensation portion. Thus, the excessive compensation by the feedforward compensation portion can be suppressed.

A method of controlling a power generation system according to the above invention is a method of controlling a power generation system in which: a power generator is driven to generate three-phase AC power by rotation of an output shaft of a continuously variable transmission including a transmission mechanism configured to steplessly change a speed change ratio of the output shaft to an input shaft; and a transmission driving device drives the transmission mechanism such that the speed change ratio of the continuously variable transmission is changed to a commanded gear change value corresponding to an input gear change command, the power generation system being configured to make the power generator generate the three-phase AC power of a predetermined set frequency. The method includes: a current detecting step of detecting current values of respective phases of a three-phase alternating current generated by the power generator; a voltage detecting step of detecting voltage values of the respective phases of the three-phase alternating current generated by the power generator; a calculating step of calculating electric power load of the power generator based on the current values detected in the current detecting step and the voltage values detected in the voltage detecting step and executing filtering work of attenuating a higher harmonic of the set frequency when calculating the electric power load of the power generator; a speed detecting step of detecting an output-side rotational speed that is a rotational speed of the output shaft; a feedback control step of executing feedback control of calculating the gear change command and outputting the obtained gear change command to the transmission driving device such that the output-side rotational speed detected in the speed detecting step becomes equal to an output-side target rotational speed corresponding to the set frequency; and a feedforward compensation step of executing feedforward compensation of correcting the gear change command, calculated in the feedback control step, based on the electric power load of the power generator, the electric power load being calculated in the calculating step.

According to the above configuration, the high frequency of the electric power load that is disturbance compensated by the feedforward compensation portion is attenuated in advance by the filtering work. With this, the occurrence of the excessive feedforward compensation (i.e., excessive correction) due to the high frequency can be suppressed. With this, the speed change ratio of the continuously variable transmission can be stably controlled.

Advantageous Effects of Invention

According to the present invention, the occurrence of the excessive feedforward compensation can be suppressed.

DESCRIPTION OF EMBODIMENTS

Hereinafter, embodiments will be described with reference to the drawings.

Power Generation System

Figure 1:
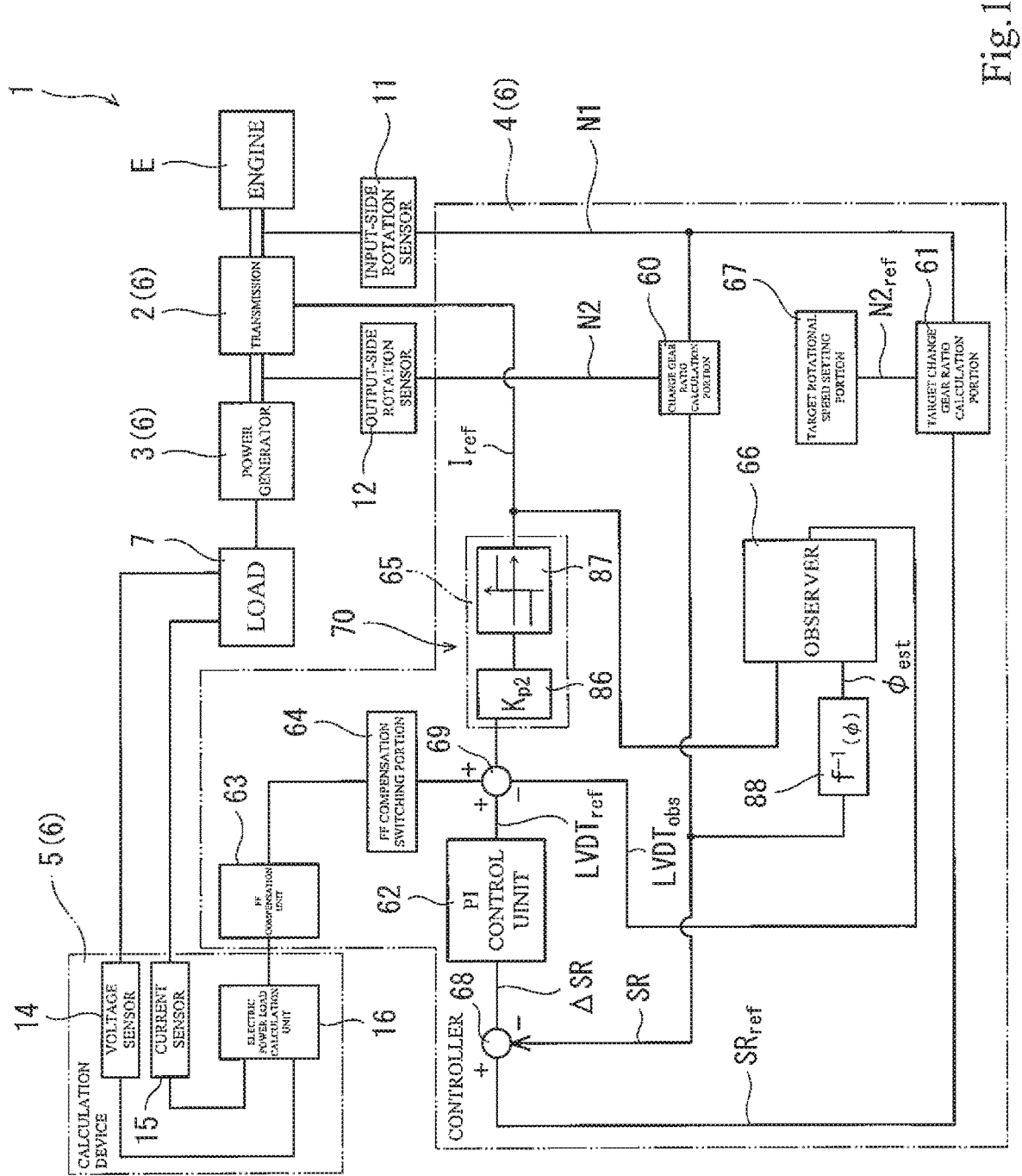
FIG. 1 is a block diagram showing the configuration of a power generation system according to the present embodiment.

A power generation system 1 shown in FIG. 1 is mounted on, for example, an aircraft and generates electric power by rotational power supplied from an engine E of the aircraft. The power generation system 1 mainly includes a transmission 2, a power generator 3, a controller 4, and an electric power load calculation device 5. The transmission 2, the controller 4, and the electric power load calculation device 5 constitute a driving mechanism integrated power generating apparatus 6 (Integrated Drive Generator; hereinafter referred to as an "IDG"). The transmission 2 changes an input rotational speed N1 of the engine E into an output rotational speed N2 at a speed change ratio SR(=N2/N1), and the power generator 3 rotates at the output rotational speed N2. In the present embodiment, the input rotational speed N1 is, for example, 4,800 to 8,500 rpm, and the controller 4 controls the operation of the transmission 2 such that the output rotational speed N2 becomes constant at a target rotational speed $N2_{ref}$ (for example, 24,000 rpm) that is a synchronous speed of the power generator 3. The transmission 2 is connected to the power generator 3.

The power generator 3 is a three-phase AC power generator. The power generator 3 receives rotational driving force output from the transmission 2 and generates AC power of an output frequency f1 corresponding to the output rotational speed N2. To be specific, the controller 4 controls the operation of the transmission 2 such that the alternating current of a rated frequency (i.e., 400 Hz) corresponding to the target rotational speed $N2_{ref}$ is generated from the power generator 3. The power generator 3 is electrically connected to a load 7, such as an electronic device or an electric actuator. The AC power generated at the power generator 3 is supplied to the load 7. The electric power load at the power generator 3 fluctuates in accordance with the operating state of the load 7, and the output rotational speed N2 fluctuates in accordance with the fluctuation of the electric power load. Therefore, in the power generation system 1, the electric power load of the power generator 3 is calculated by the electric power load calculation device 5, and the controller 4 executes feedback control of the operation of the transmission 2 based on the electric power load. Respective components of the power generation system 1 configured as above will be described in more detail.

Figure 2:
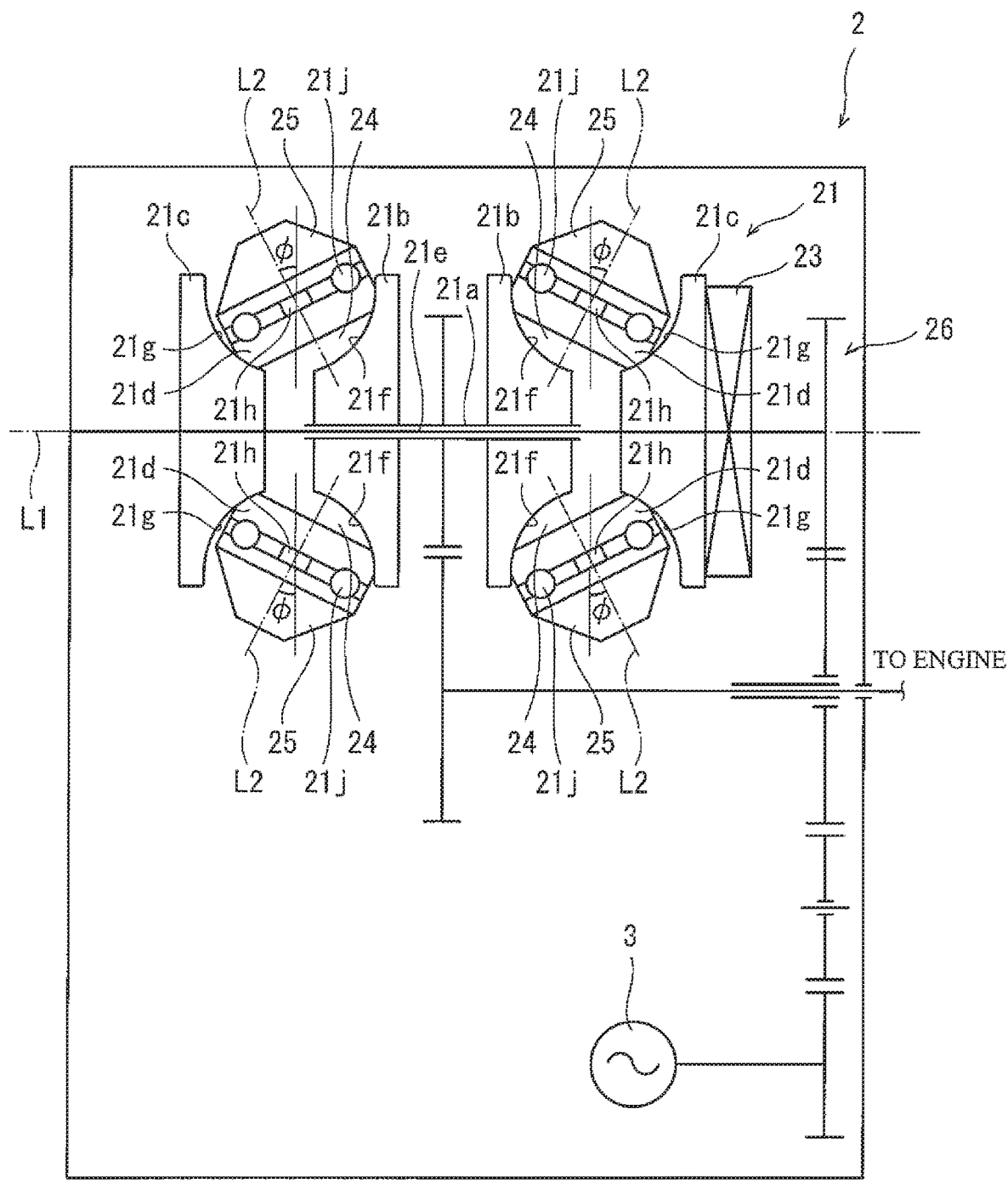
FIG. 2 is a schematic diagram showing the configuration of a transmission included in the power generation system of FIG. 1.

The transmission 2 includes a toroidal continuously variable transmission (hereinafter referred to as a "toroidal CVT") 21 shown in FIG. 2 and a transmission driving mechanism 22. The toroidal CVT 21 is a so-called double cavity type half toroidal CVT and mainly includes an input shaft 21a, an input disc 21b, an output disc 21c, a plurality of power rollers 21d, and an output shaft 21e. The input shaft 21a is connected to the engine E and is rotated around a rotation axis L1 by the engine E. The input shaft 21a rotates in conjunction with the input disc 21b, and the output disc 21c is arranged so as to be opposed to the input disc 21b. The input disc 21b includes a friction surface 21f, and the output disc 21c includes a friction surface 21g. The friction surfaces 21f and 21g are arranged so as to be opposed to each other. Each of the friction surfaces 21f and 21g is formed such that a cutting surface obtained by cutting the disc (21b, 21c) along a plane including the rotation axis L1 has a ¼ circular-arc shape. Therefore, an annular cavity 24 including a cutting surface having a substantially semi-circular shape is formed between the input disc 21b and the output disc 21c. The plurality of power rollers 21d (two power rollers 21d in the present embodiment) are arranged in the cavity 24 at regular intervals.

Each of the power rollers 21d is formed in a substantially circular plate shape. An outer peripheral edge portion of the power roller 21d has a partially spherical shape. The power roller 21d is fitted in between the input disc 21b and the output disc 21c with the outer peripheral edge portion contacting the two friction surfaces 21f and 21g. A roller shaft 21h is inserted into each power roller 21d along a central axis L2. A thrust bearing 21j is formed integrally with the roller shaft 21h. The power roller 21d is rotatably supported by a trunnion 25 (also see FIG. 3) through the thrust bearing 21j. The power roller 21d rotates about the roller shaft 21h (i.e., about the central axis L2) while contacting the two discs 21b and 21c. A clamp mechanism 23 is provided at the output disc 21c. The clamp mechanism 23 is a cam type clamp mechanism (may also be referred to as a loading mechanism) or a hydraulic clamp mechanism. The clamp mechanism 23 pushes the output disc 21c toward the input disc 21b to make the output disc 21c and the input disc 21b sandwich the power rollers 21d. With this, a lubricating oil film having high viscosity is interposed between the power roller 21d and each of the discs 21b and 21c, and the rotational driving force input to the input disc 21b is transmitted to the output disc 21c through the power rollers 21d by shear resistance of the lubricating oil films. The output shaft 21e that rotates in conjunction with the output disc 21c is provided at the output disc 21c. The output shaft 21e is connected to the power generator 3 through a power transmission mechanism 26. To be specific, the output disc 21c is connected to the power generator 3 through the output shaft 21e and the power transmission mechanism 26. As above, the toroidal CVT 21 transmits the rotational driving force of the engine E to the power generator 3.

Figure 3:
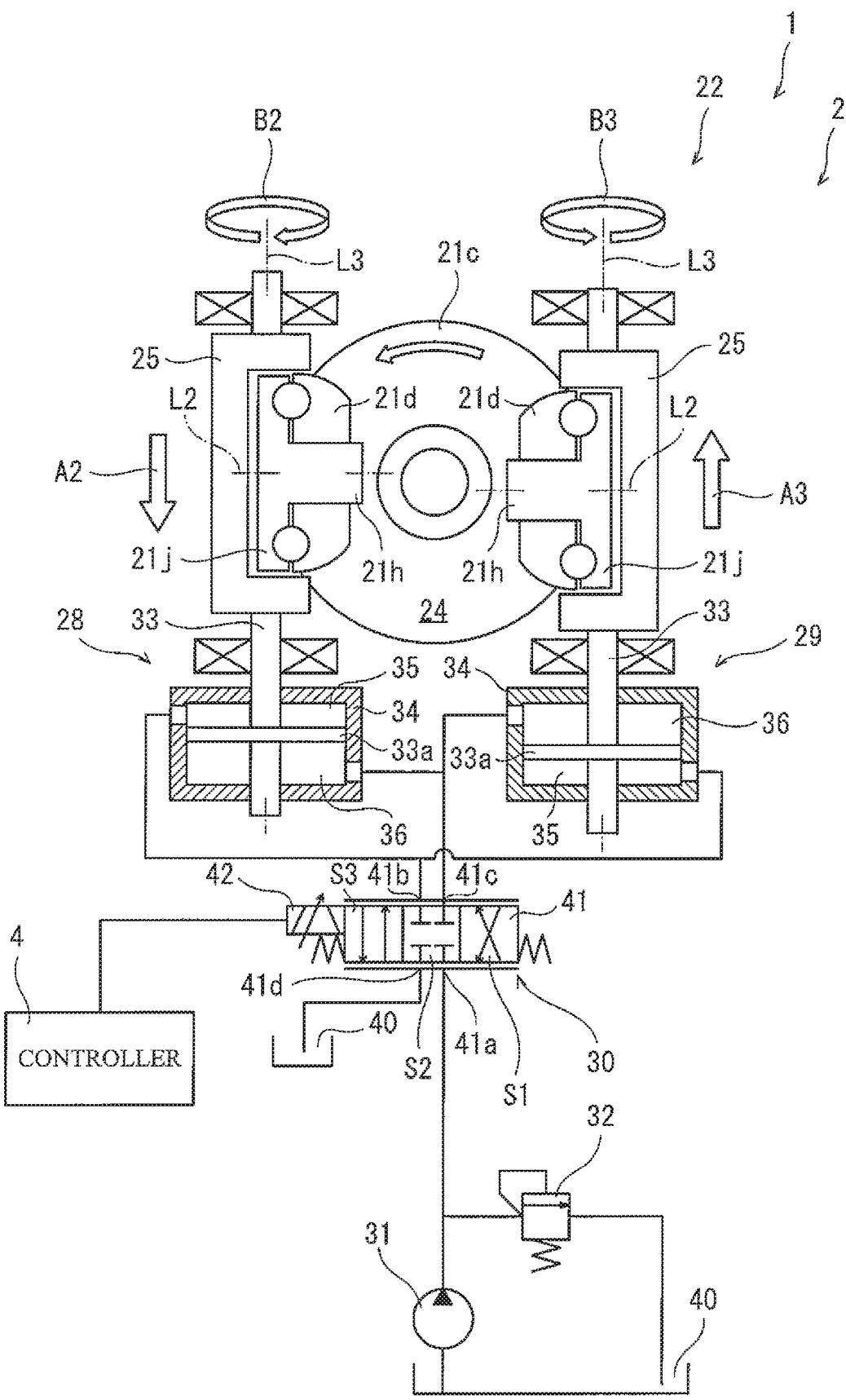
FIG. 3 is a circuit diagram showing a hydraulic circuit of a hydraulic driving device included in the power generation system of FIG. 1.

The trunnion 25 is configured to be turnable about a rotation axis L3 (see FIG. 3) passing through the center of the circular-arc shape of the cavity 24 and extending in a direction perpendicular to the central axis L2 (see arrows B2 and B3 in FIG. 3). By the turning of the trunnion 25, the power roller 21d tilts, and therefore, a tilting angle φ of the power roller 21d (i.e., an inclination angle of the roller shaft 21h) changes. By changing the tilting angle φ as above, a contact point between the power roller 21d and each of the friction surfaces 21f and 21g changes, and as a result, the output rotational speed of the output disc 21c changes. The trunnion 25 is configured to be displaceable in a tilt axis direction along the rotation axis L3. When the trunnion 25 is displaced, the tilting angle φ of the power roller 21d is adjusted to an angle corresponding to the displacement magnitude of the trunnion 25. To be specific, the toroidal CVT 21 can steplessly adjust the speed change ratio SR by moving the trunnions 25 and can adjust the speed change ratio SR to a value corresponding to the displacement magnitudes of the trunnions 25. In order to change the speed change ratio SR, the toroidal CVT 21 configured as above is provided with the transmission driving mechanism 22.

As shown in FIG. 3, the transmission driving mechanism 22 includes two hydraulic cylinder mechanisms 28 and 29, a direction switching valve 30, a pump 31, and a relief valve 32. The hydraulic cylinder mechanisms 28 and 29 are provided so as to correspond to the respective trunnions 25 and advance or retreat the corresponding trunnions 25 in the tilt axis direction. Each of the hydraulic cylinder mechanisms 28 and 29 includes a piston rod 33 and a cylinder 34. The piston rod 33 is provided integrally with the trunnion 25 and inserted into the cylinder 34. The inside of the cylinder 34 is divided into a deceleration chamber 35 and an acceleration chamber 36 by a pressure receiving portion 33a formed at the piston rod 33. By supplying pressure oil to the deceleration chamber 35 or the acceleration chamber 36, the piston rod 33 advances or retreats to change the position of the trunnion 25. The pump 31 is connected to the deceleration chamber 35 and the acceleration chamber 36 through the direction switching valve 30.

The pump 31 is connected to the engine E through the toroidal CVT 21 and the power transmission mechanism 26 (details of the connection status are not shown). The pump 31 is driven by the rotational driving force of the engine E to eject the pressure oil. The pressure oil ejected from the pump 31 is introduced to the direction switching valve 30 and is then supplied to the deceleration chamber 35 or the acceleration chamber 36 by the direction switching valve 30. To be specific, a below-described valve opening degree command value $I_{ref}$ is input to the direction switching valve 30, and the direction switching valve 30 changes the flow direction and flow rate of the pressure oil ejected from the pump 31 based on the valve opening degree command value $I_{ref}$.

Figure 4:
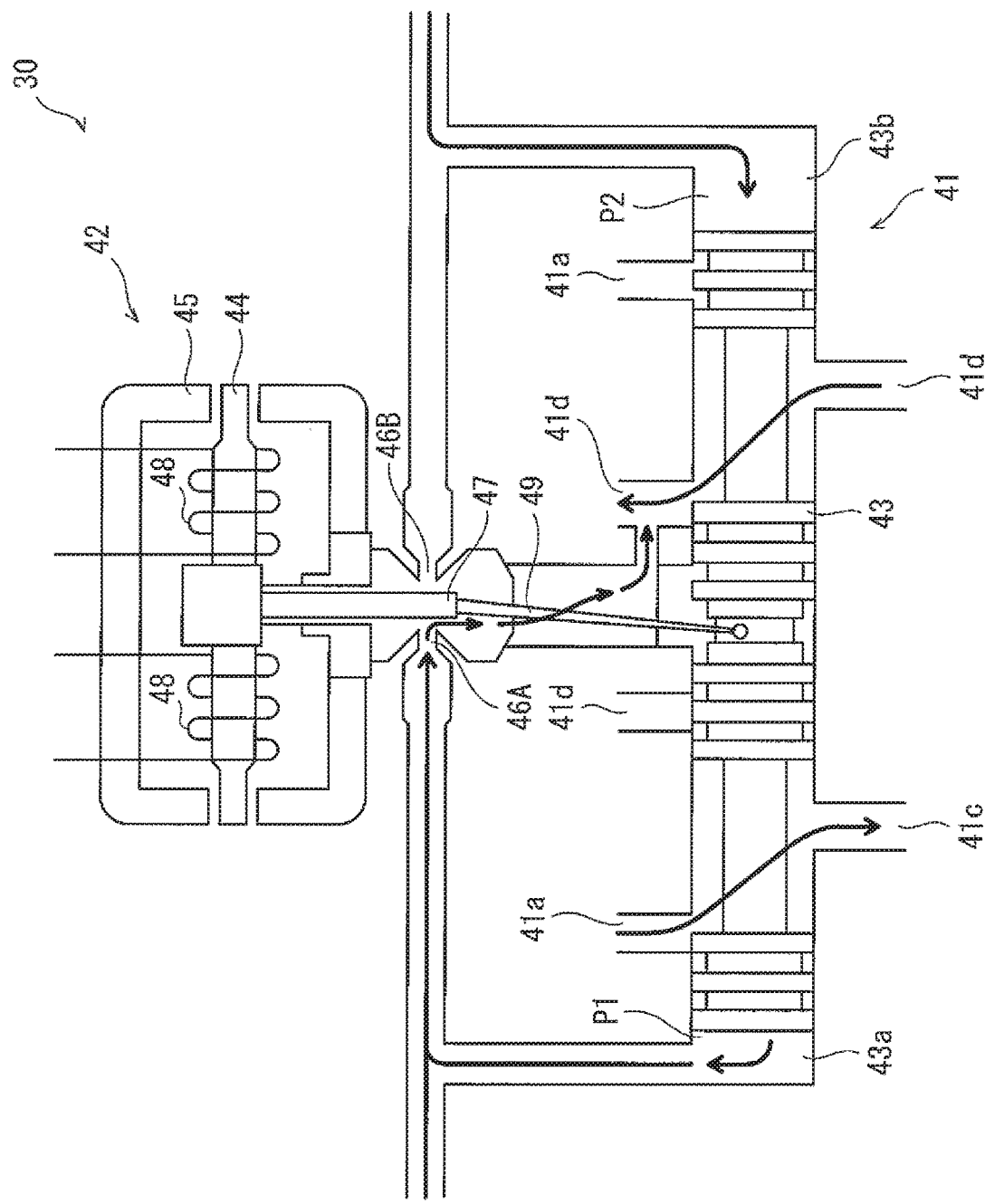
FIG. 4 is a diagram schematically showing the configuration of a direction switching valve in the hydraulic driving device of FIG. 2.

More specifically, the direction switching valve 30 is, for example, a nozzle-flapper type servo valve shown in FIG. 4 and includes a control valve 41 and an electromagnetic driving mechanism 42. The control valve 41 is a spool valve and includes a pump port 41a, a first port 41b, a second port 41c, and a tank port 41d. The pump port 41a is connected to the pump 31, and the first port 41b is connected to the deceleration chambers 35 of the hydraulic cylinder mechanisms 28 and 29. The second port 41c is connected to the acceleration chambers 36 of the hydraulic cylinder mechanisms 28 and 29, and the tank port 41d is connected to a tank 40. Connection statuses of these four ports 41a to 41d are switched by a spool 43 of the control valve 41, and the electromagnetic driving mechanism 42 configured to drive the spool 43 is provided at the spool 43.

The electromagnetic driving mechanism 42 includes an armature 44, a permanent magnet piece 45, a flapper 47, and a pair of nozzles 46A and 46B. The armature 44 is a long rod-shaped member, and a longitudinal direction middle portion of the armature 44 is supported. The armature 44 is angularly displaced about the supported portion thereof. Coils 48 are wound around both respective longitudinal direction side portions of the armature 44. Further, the permanent magnet piece 45 is arranged at both longitudinal direction end portions of the armature 44. When drive current (valve opening degree command value $I_{ref}$) is supplied to the coils, the armature 44 is angularly displaced about the supported portion thereof. The flapper 47 is provided integrally with the longitudinal direction middle portion of the armature 44. When the armature 44 is angularly displaced, the flapper 47 swings. The flapper 47 that moves as above is arranged between the pair of nozzles 46A and 46B.

The nozzle 46A is connected to a pilot chamber 43a formed at one end of the spool 43 and changes pilot pressure P1 supplied to the pilot chamber 43a, and the nozzle 46B is connected to a pilot chamber 43b formed at the other end of the spool 43 and changes pilot pressure P2 supplied to the pilot chamber 43b. To be specific, when the flapper 47 swings to approach the nozzle 46A, the pilot pressure P1 increases, and the pilot pressure P2 decreases. In contrast, when the flapper 47 swings to approach the nozzle 46B, the pilot pressure P2 increases, and the pilot pressure P1 decreases (see FIG. 4). The spool 43 receives the pilot pressure P1 of the pilot chamber 43a and the pilot pressure P2 of the pilot chamber 43b. The position of the spool 43 changes in accordance with the pressure difference between the pilot pressure P1 and the pilot pressure P2. The flapper 47 is connected to the spool 43 through a feedback spring 49. When the pressure difference between the pilot pressure P1 and the pilot pressure P2 is generated, the feedback spring 49 adjusts a swing angle of the flapper 47 such that the pressure difference becomes zero.

In the direction switching valve 30 configured as above, the valve opening degree command value $I_{ref}$ is input to the electromagnetic driving mechanism 42 as described above, and the position of the spool 43 is switched in accordance with the valve opening degree command value $I_{ref}$ input to the electromagnetic driving mechanism 42. For example, when the pressure P1 becomes higher than the pressure P2, the spool 43 moves to a first position S1 as shown in FIG. 3. With this, the pump port 41a is connected to the deceleration chambers 35 of the hydraulic cylinder mechanisms 28 and 29 through the first port 41b, and the tank port 41d is connected to the acceleration chambers 36 of the hydraulic cylinder mechanisms 28 and 29 through the second port 41c. When the pressure P1 becomes equal to the pressure P2, the spool 43 is located at a second position S2. With this, the first port 41b and the second port 41c are blocked, and the pump port 41a is connected to the tank port 41d. Further, when the pressure P1 becomes lower than the pressure P2, the spool 43 moves to a third position S3. With this, the pump port 41a is connected to the acceleration chambers 36 of the hydraulic cylinder mechanisms 28 and 29 through the second port 41c, and the tank port 41d is connected to the deceleration chambers 35 of the hydraulic cylinder mechanisms 28 and 29 through the first port 41b. The direction switching valve 30 switches the flow direction of the operating oil as above and supplies the operating oil to the deceleration chambers 35 and acceleration chambers 36 of the hydraulic cylinder mechanisms 28 and 29.

When the operating oil is supplied to the deceleration chamber 35 or the acceleration chamber 36, the hydraulic cylinder mechanism (28, 29) expands or contracts, and the trunnion 25 advances or retreats in the tilt axis direction in accordance with the expansion or contraction of the hydraulic cylinder mechanism (28, 29). It should be noted that the positions of the deceleration chamber 35 and acceleration chamber 36 of the hydraulic cylinder mechanism 28 with respect to the pressure receiving portion 33a are opposite to the positions of the deceleration chamber 35 and acceleration chamber 36 of the hydraulic cylinder mechanism 29 with respect to the pressure receiving portion 33a. Therefore, when the operating oil is supplied to the deceleration chambers 35 or the acceleration chambers 36, one of the hydraulic cylinder mechanisms 28 and 29 expands, and the other of the hydraulic cylinder mechanisms 28 and 29 contracts. With this, one of the two trunnions 25 advances in the tilt axis direction (see an arrow A2 in FIG. 3, for example), and the other of the two trunnions 25 retreats in the tilt axis direction (see an arrow A3 in FIG. 3, for example). When each of the two trunnions 25 advances or retreats, the power rollers 21d tilt (see the arrows B2 and B3 in FIG. 3), and with this, the speed change ratio SR of the toroidal CVT is changed. As above, the transmission driving mechanism 22 can change the speed change ratio SR of the toroidal CVT by operating the direction switching valve 30. In order to move the spool 43 of the direction switching valve 30 to control the speed change ratio SR of the toroidal CVT, the controller 4 is connected to the electromagnetic driving mechanism 42 of the direction switching valve 30.

The controller 4 has a function of controlling the operation of the transmission driving mechanism 22, more specifically, the operation of the electromagnetic driving mechanism 42. In order to control the operation of the electromagnetic driving mechanism 42, as shown in FIG. 1, an input-side rotation sensor 11, an output-side rotation sensor 12, and the electric power load calculation device 5 are electrically connected to the controller 4. The input-side rotation sensor 11 outputs a signal corresponding to the input rotational speed N1 of the engine E, and the output-side rotation sensor 12 outputs a signal corresponding to the rotational speed N2 of the power generator 3. The electric power load calculation device (hereinafter simply referred to as a "calculation device") 5 calculates the electric power load of the power generator 3, the electric power load acting as disturbance when the controller 4 executes the feedback control.

Figure 5:
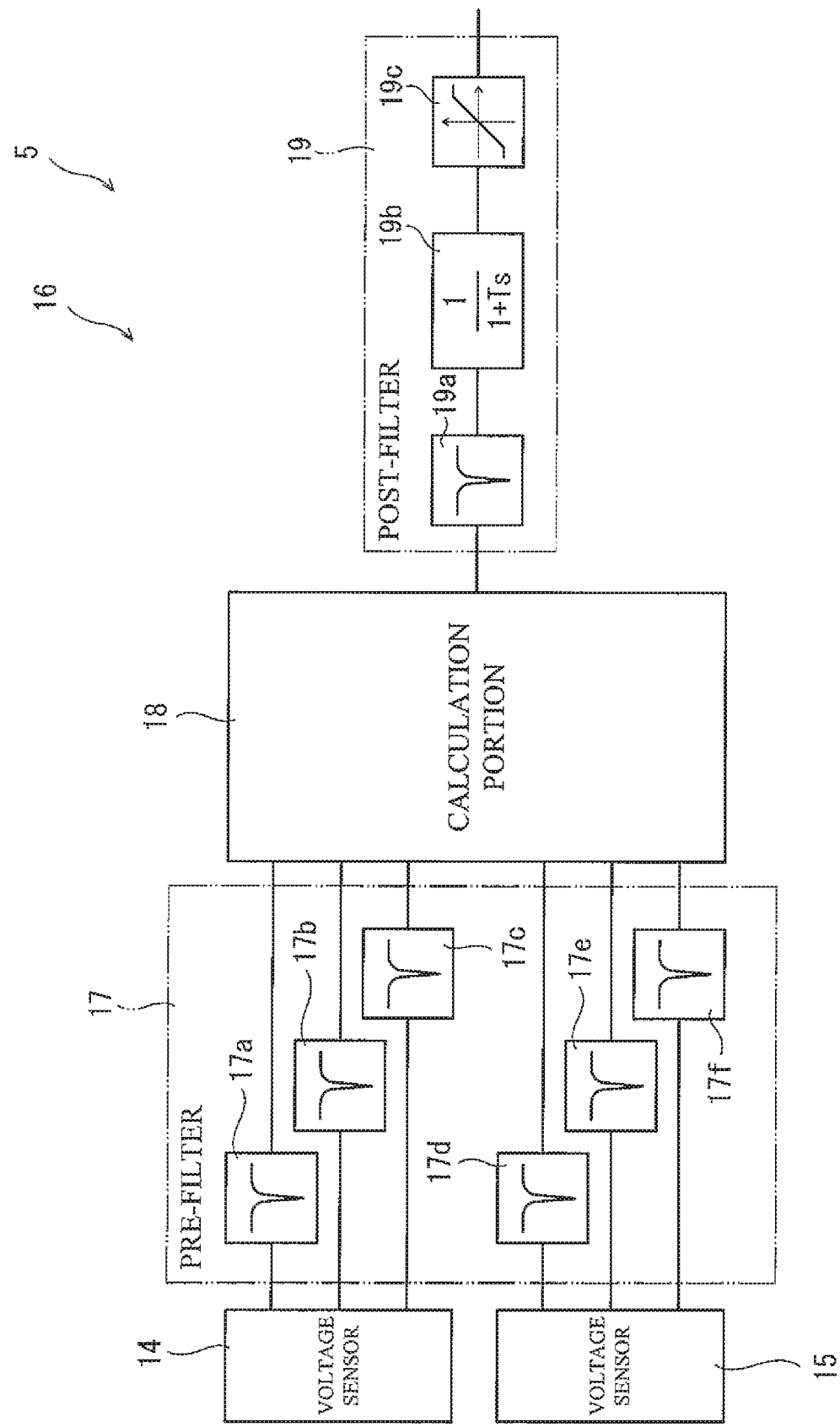
FIG. 5 is a block diagram showing the electrical configuration of a PI control unit in a controller of FIG. 4.

The calculation device 5 includes a voltage sensor 14, a current sensor 15, and an electric power load calculator 16. The voltage sensor 14 outputs signals corresponding to load voltage values $V_A$, $V_B$, and $V_C$ of respective phases of the AC power supplied to the load 7, and the current sensor 15 outputs signals corresponding to load current values $I_A$, $I_B$, and $I_C$ of the respective phases of the AC power supplied to the load. The output signals are input to the electric power load calculator (hereinafter simply referred to as a "calculator") 16. The calculator 16 may be incorporated in the controller 4 or may be configured separately from the controller 4. Further, the calculator 16 may be realized by software or hardware. When the calculator 16 is realized by software, the calculator 16 is realized by, for example, calculation processing performed by a CPU (Central Processing Unit) and a FPGA (field-programmable gate array). The calculator 16 configured as above calculates the electric power load based on the six signals output from the voltage sensor 14 and the current sensor 15. The calculator 16 executes filtering work of attenuating a higher harmonic of the rated frequency, and with this, the influence of the higher harmonic in the feedforward control is suppressed. As shown in FIG. 5, the calculator 16 having such functions includes a pre-filter 17, a calculation portion 18, and a post-filter 19.

Figure 6:
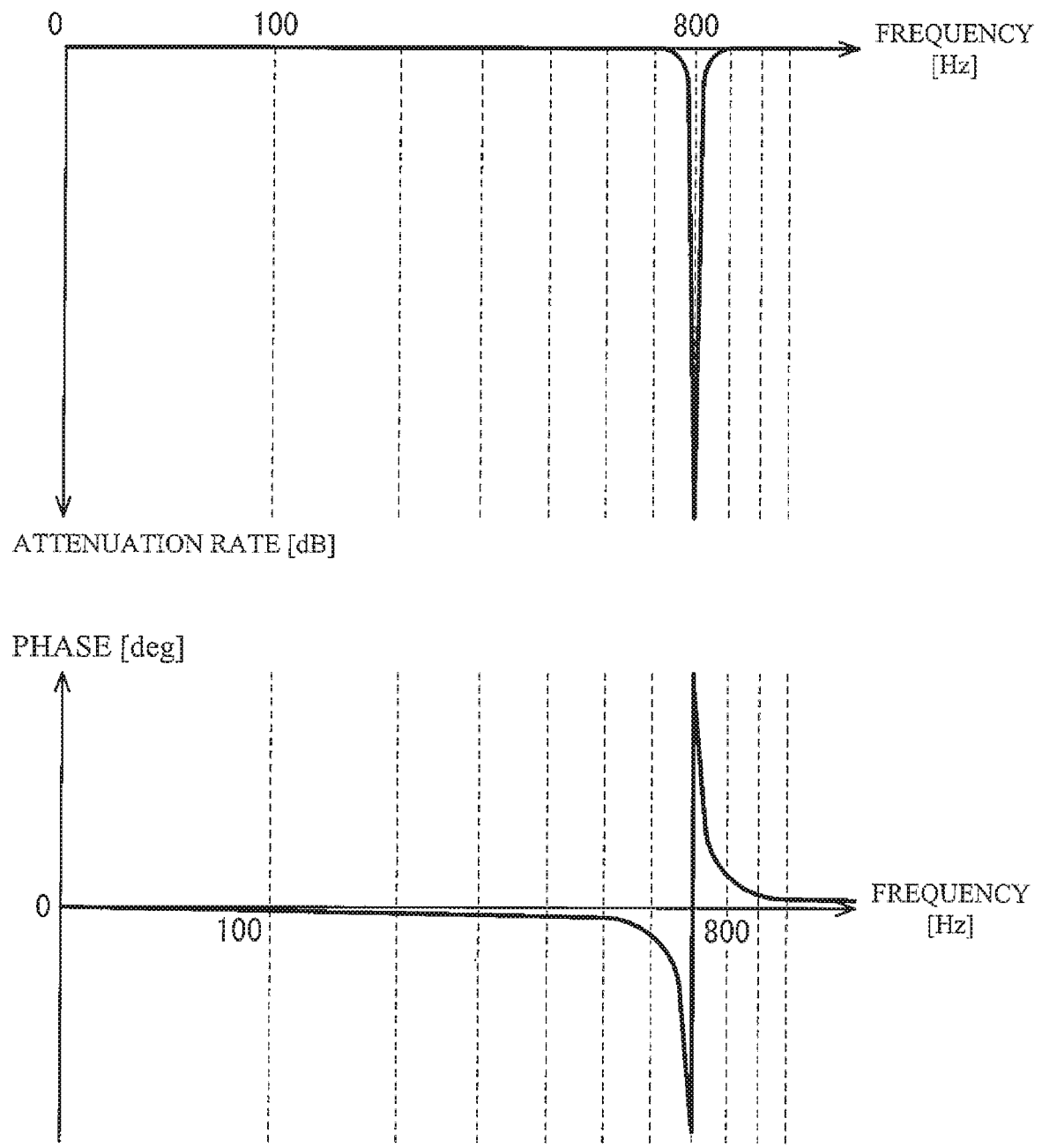
FIG. 6 is a block diagram showing the electrical configuration of a calculation device of FIG. 4.

The pre-filter 17 is connected to the voltage sensor 14 and the current sensor 15 and executes filtering of the higher harmonic of the rated frequency with respect to the six signals output from the sensors 14 and 15. More specifically, the pre-filter 17 includes, for example, six notch filter portions 17a to 17f. The notch filter portions 17a to 17f attenuate specific higher harmonics of the six signals input from the voltage sensor 14 and the current sensor 15. In the present embodiment, the notch filter portions 17a to 17f attenuate second higher harmonics (about 800 Hz) of the six signals (see the bode diagram of FIG. 6). In FIG. 6, a graph at an upper side shows the magnitude of an attenuation rate with respect to the frequency, and a graph at a lower side shows the degree of a phase shift with respect to the frequency. Each of the notch filter portions 17a to 17f may be constituted by only one notch filter that is a band elimination filter configured to attenuate the second higher harmonic (about 800 Hz). However, a notch filter configured to attenuate a frequency shifted from the second higher harmonic by a predetermined frequency may be added to each of the notch filter portions 17a to 17f. With this, noises around the second higher harmonic (for example, noises in a range of ±14 Hz with respect to the second higher harmonic) can also be attenuated, and therefore, even when the second higher harmonic is shifted from 800 Hz, the second higher harmonic can be attenuated.

After the second higher harmonics are eliminated from the six signals by the pre-filter 17, these six signals are used for calculations performed by the calculation portion 18. To be specific, the calculation portion 18 calculates the load voltage values $V_A$, $V_B$, and $V_V$ of the respective phases of the AC power and the load current values $I_A$, $I_B$, and $I_C$ of the respective phases of the AC power from the six signals and further calculates electric power load LOAD (an instantaneous value or an effective value) of the load 7 based on a non-linear calculation formula (1) below. It should be noted that f represents the rated frequency.

Formula 1

$$\text{LOAD} = (V_A \times I_A \times V_B \times I_B + V_C \times I_C) + \sqrt{(A^2+B^2)} \times \sin(2(2\pi f) \times t \times \alpha)$$

$$A = -(2V_A \times I_A - V_B \times I_B - V_C \times I_C)/2,$$
$$B = -\sqrt{3}(V_B \times I_B - V_C \times I_C)/2$$

$$\cos \alpha = A/\sqrt{(A^2+B^2)}, \sin \alpha = B/\sqrt{(A^2+B^2)} \quad (1)$$

Figure 7:
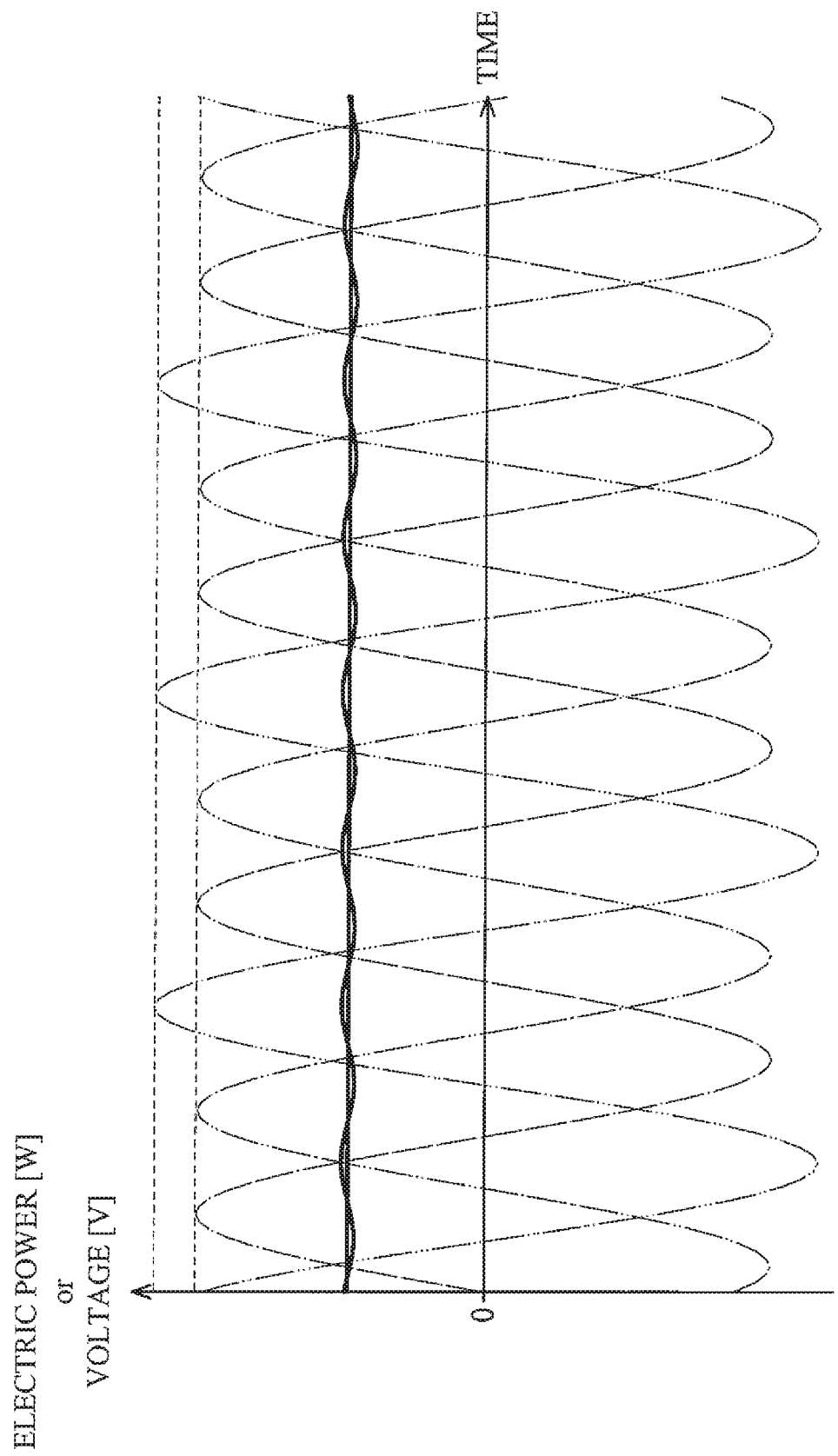
FIG. 7 is a bode diagram showing an attenuation rate and phase shift of a notch filter in the calculation device of FIG. 4.

The electric power load LOAD is calculated based on Formula (1). Therefore, when the load 7 forms an unbalanced circuit, and the voltages of the respective phases are unbalanced as shown in FIG. 7 (i.e., $V_A = V_B \ne V_C$), the higher harmonic appears in the calculated electric power load LOAD (see a solid line in FIG. 7). FIG. 7 shows time-lapse changes of the voltages of the respective phases. In FIG. 7, the voltage value $V_A$ is shown by a one-dot chain line, the voltage value $V_B$ is shown by a two-dot chain line, and the voltage value $V_C$ is shown by a three-dot chain line. Since the higher harmonic contained in the electric power load LOAD influences the below-described feedforward control, the filtering with respect to the calculated electric power load LOAD is executed again by the post-filter 19.

The post-filter 19 executes filtering to attenuate the higher harmonic contained in the electric power load LOAD calculated by the calculation portion 18. Specifically, the post-filter 19 includes a notch filter portion 19a, a low pass filter portion 19b, and a limit filter 19c. As with the notch filter portions 17a to 17f, the notch filter portion 19a attenuates a specific higher harmonic. In the present embodiment, the notch filter portion 19a attenuates the second higher harmonic (about 800 Hz). The second higher harmonic contained in the electric power load LOAD is attenuated by the notch filter portion 19a. It should be noted that another notch filter may be added to the notch filter portion 19a. After the second higher harmonic is eliminated as above, the filtering of the electric power load LOAD is executed by the low pass filter portion 19b.

The low pass filter portion 19b attenuates a frequency component higher than the second higher harmonic, especially an N-th higher harmonic (N=3, 4, ... ). The low pass filter portion 19b attenuates a wider frequency band of the signal than the notch filter portion 19a. Therefore, the frequency band in which the phase shift occurs is also wide. On this account, when the low pass filter portion 19b attenuates the second higher harmonic, the signal of the rated frequency is attenuated, and the phase shift is caused. On the other hand, the frequency band attenuated by the notch filter portion 19a is narrow as shown in FIG. 6, but the frequency band in which the phase shift occurs is also narrow. Therefore, by using the notch filter portion 19a to attenuate the second higher harmonic, the filtering work of the second higher harmonic can be executed while suppressing the attenuation and phase shift of the signal of the rated frequency. On the other hand, when the attenuation by the low pass filter portion 19b is performed in the frequency band that does not influence the signal of the rated frequency (i.e., in the frequency band including the third higher harmonic and the higher harmonics higher than the third higher harmonic), noises of the frequency band which is not limited to the N-th higher harmonic can be attenuated. Thus, the higher harmonic of the electric power load LOAD is attenuated by the notch filter portion 19a and the low pass filter portion 19b.

According to the calculation device 5 configured as above, before calculating the electric power load LOAD, the higher harmonics contained in the voltage values $V_A$, $V_B$, and $V_C$ and current values $I_A$, $I_B$, and $I_C$ of the respective phases can be attenuated by the pre-filter 17. Therefore, the higher harmonic can be prevented from appearing in the electric power load LOAD. Further, the filtering of the electric power load LOAD is executed by the post-filter 19, and with this, the higher harmonic generated in the electric power load due to the unbalance of the current values and voltage values of the respective phases can be attenuated. With this, the electric power load which is easy to refer to in control or the like can be calculated. The electric power load LOAD calculated as above is limited to a value within a range from an upper limit to a lower limit by the limit filter 19c and is then output to the controller 4.

The controller 4 is constituted by, for example, a CPU or a FPGA and has the following functions. To be specific, the controller 4 detects the input rotational speed N1 based on the signal output from the input-side rotation sensor 11 and detects the rotational speed N2 based on the signal output from the output-side rotation sensor 12. Further, the controller 4 receives the electric power load LOAD from the calculator 16 and controls the operation of the transmission driving mechanism 22 based on the input rotational speed N1, the rotational speed N2, and the electric power load LOAD. Hereinafter, the controller 4 will be described with reference to the control block of FIG. 1.

The controller 4 controls the operation of the transmission driving mechanism 22 to adjust the speed change ratio SR of the toroidal CVT 21 such that the rotational speed of the power generator 3 becomes constant at the target rotational speed $N2_{ref}$. To be specific, the controller 4 mainly includes a speed change ratio calculation portion 60, a target speed change ratio calculation portion 61, a PI control unit 62, a feedforward (hereinafter "FF") compensation unit 63, a FF compensation switching portion 64, a valve opening degree command value calculation portion 65, and an observer 66. The speed change ratio calculation portion 60 refers to the signals output from the input-side rotation sensor 11 and the output-side rotation sensor 12 and calculates a ratio of the input rotational speed N1 and the output rotational speed N2, i.e., the speed change ratio SR as an actual speed change ratio based on these signals. The target speed change ratio calculation portion 61 calculates the target speed change ratio $SR_{ref}$ different from the speed change ratio SR. To be specific, the target speed change ratio calculation portion 61 refers to the target rotational speed $N2_{ref}$ set at the target rotational speed setting portion 67 and the signal output from the input-side rotation sensor 11 and calculates the target speed change ratio $SR_{ref}$ that is a ratio of the input rotational speed N1 and the target rotational speed $N2_{ref}$ based on the target rotational speed $N2_{ref}$ and the signal output from the input-side rotation sensor 11. The speed change ratio SR and the target speed change ratio $SR_{ref}$ are used by a speed change ratio subtracter 68, and the speed change ratio subtracter 68 calculates a speed change ratio difference ΔSR by subtracting the speed change ratio SR from the target speed change ratio $SR_{ref}$. The obtained speed change ratio difference ΔSR is used by the PI control unit 62.

Figure 8:
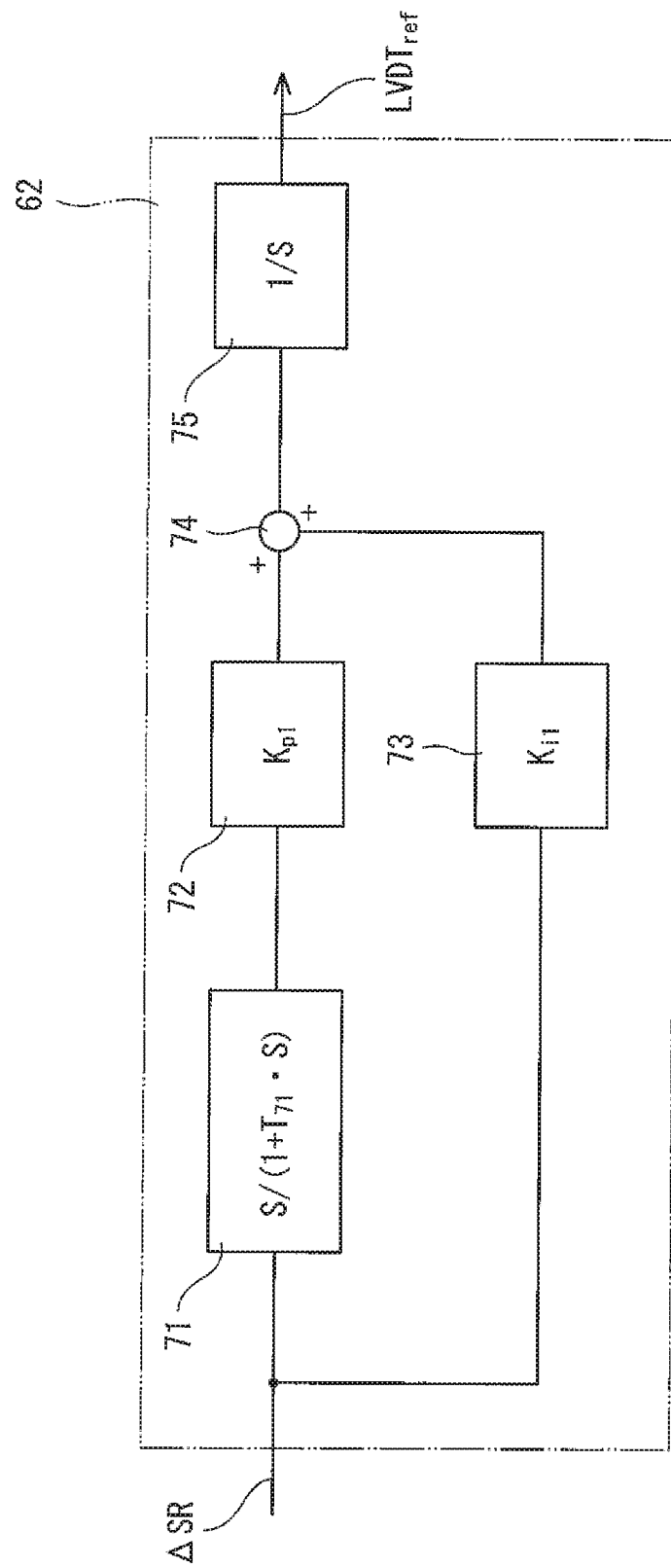
FIG. 8 is a block diagram showing the electrical configuration of a FF compensation unit in the controller of FIG. 6.

The PI control unit 62 executes PI control using the speed change ratio difference ΔSR as an input value and a transmission drive command value $LVDT_{ref}$ as an output value such that the speed change ratio SR becomes equal to the target speed change ratio $SR_{ref}$. More specifically, as shown in FIG. 8, the PI control unit 62 includes a pseudo differential unit 71, a proportional gain multiplying portion 72, an integration gain multiplying portion 73, an adder 74, and an integrator 75. The pseudo differential unit 71 uses a transfer function $F_{71}$ (Formula (2)) to perform pseudo differential with respect to the speed change ratio difference ΔSR. In Formula (2), s represents a complex variable, and $T_{71}$ represents a time constant.

$$F_{71} = s/(1+T_{71} \cdot s) \tag{2}$$

The value obtained by the pseudo differential unit 71 is multiplied by a proportional gain $K_{p1}$ by the proportional gain multiplying portion 72.

Further, the speed change ratio difference ΔSR to which the PI control unit 62 refers is multiplied by an integration gain $K_{i1}$ by the integration gain multiplying portion 73 separately from the above pseudo differential. The value obtained by the integration gain multiplying portion 73 is added by the adder 74 to the value obtained by the proportional gain multiplying portion 72. The value obtained by the adder 74 is integrated by the integrator 75, and the value obtained by the integrator 75 becomes a stroke amount command value $LVDT_{ref}$. The stroke amount command value $LVDT_{ref}$ denotes a required stroke amount of the expansion or contraction of each of the piston rods 33 of the hydraulic cylinder mechanisms 28 and 29. In order to correct the stroke amount command value $LVDT_{ref}$, a FF correction amount is added by an adder-subtracter 69 as shown in FIG. 1. In order to calculate the FF correction amount, the controller 4 includes the FF compensation unit 63.

Figure 9:
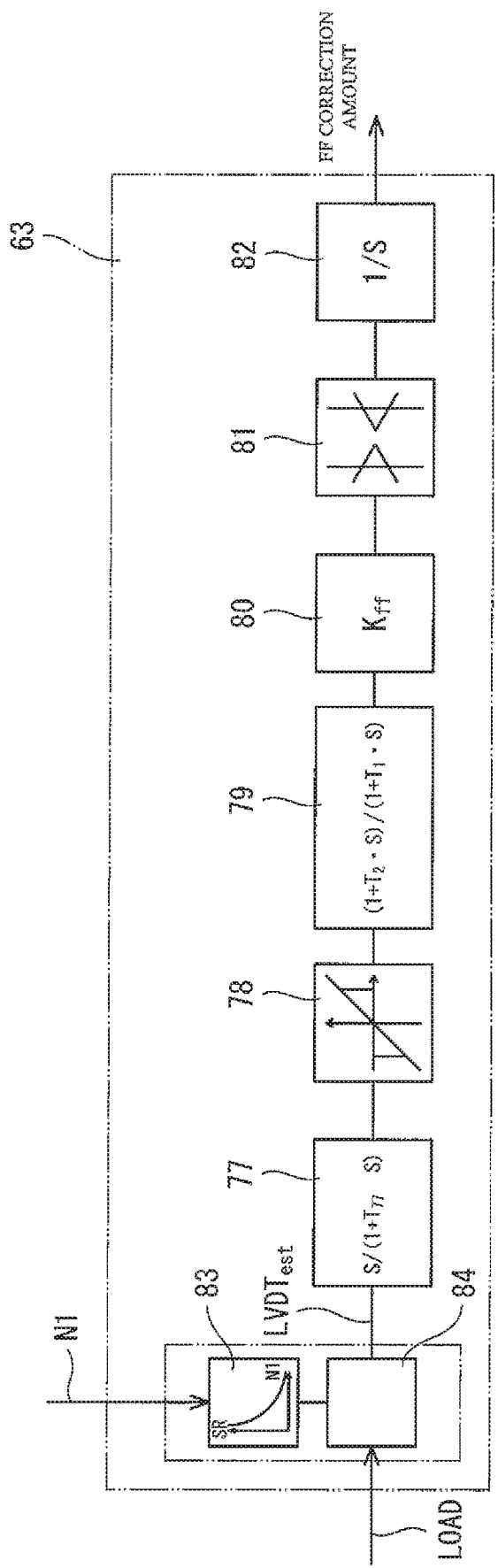
FIG. 9 is a graph showing examples of a time-lapse change of a voltage value detected by a voltage sensor of FIG. 6 and an electric power load.

The FF compensation unit 63 as a FF compensation portion determines the FF correction amount based on the electric power load LOAD obtained by the calculation device 5 and the signal (i.e., the input rotational speed N1) output from the input-side rotation sensor 11. To be specific, as shown in FIG. 8, the FF compensation unit 63 includes a stroke correction amount calculation portion 76, a pseudo differential unit 77, a dead zone filter 78, a phase compensation portion 79, a gain adjusting portion 80, a rate limit portion 81, and an integrator 82. The stroke correction amount calculation portion 76 calculates a stroke correction amount of the piston rod (38, 39) in accordance with the magnitude of the electric power load LOAD. Specifically, the stroke correction amount calculation portion 76 first calculates the input rotational speed N1 of the engine E based on the signal output from the input-side rotation sensor 11 and calculates the target speed change ratio $SR_{ref}$ based on the input rotational speed N1 and the target rotational speed $N2_{ref}$ (see a reference sign 83 in FIG. 9). Next, by using a prestored table (see a reference sign 84 in FIG. 9), a function, or the like, the stroke correction amount calculation portion 76 calculates a correction estimated command value $LVDT_{est}$ based on the electric power load LOAD and the target speed change ratio $SR_{ref}$. Further, the correction estimated command value $LVDT_{est}$ is subjected to filtering by the pseudo differential unit 77, the dead zone filter 78, the phase compensation portion 79, the gain adjusting portion 80, the rate limit portion 81, and the integrator 82.

To be specific, in order to calculate a time change rate of the correction estimated command value $LVDT_{est}$ (i.e., in order to convert the correction estimated command value $LVDT_{est}$ into a speed value), the pseudo differential unit 77 performs the pseudo differential with respect to the correction estimated command value $LVDT_{est}$ by using a transfer function $F_{77}$ (Formula (3)). In Formula (3), s represents a complex variable, and $T_{77}$ represents a time constant.

$$F_{77}=s/(1+T_{77}\cdot S) \quad (3)$$

The time change rate of the correction estimated command value $LVDT_{est}$ calculated based on the transfer function $F_{77}$ is subjected to filtering by the dead zone filter 78. The dead zone filter 78 eliminates high-frequency noise of a small fluctuation width from the time change rate of the correction estimated command value $LVDT_{est}$. The time change rate of the correction estimated command value $LVDT_{est}$ from which the noise is eliminated is next subjected to time delay compensation by the phase compensation portion 79.

To be specific, in order to compensate a time delay caused due to, for example, an operation delay of the transmission driving mechanism 22, the phase compensation portion 79 executes phase delay compensation by using a transfer function $F_{79}$ (Formula (4)). In Formula (4), s represents a complex variable, and $T_1$ and $T_2$ are time constants.

$$F_{79}=(1+T_2\cdot s)/(1+T_1\cdot s) \quad (4)$$

The output value obtained by the phase delay compensation based on the transfer function F79 is multiplied by a gain $K_{ff}$ by the gain adjusting portion 80 and is then limited within a range from an upper limit to a lower limit by the rate limit portion 81. After that, the output value is integrated by the integrator 82, and the obtained value as the FF correction amount is referred to by the FF compensation switching portion 64.

Based on the rotational frequency of the power generator 3, i.e., based on the output rotational speed N2, the FF compensation switching portion 64 determines whether to execute the FF compensation, i.e., the FF compensation switching portion 64 switches between the execution and stop of the FF compensation. Specifically, the FF compensation switching portion 64 determines whether or not the output rotational speed N2 calculated based on the signal output from the output-side rotation sensor 12 falls within a predetermined range (for example, $N2_{ref}-\alpha \leq N2 \leq N2_{ref}+\alpha$) including the synchronous speed of the power generator 3, i.e., the target rotational speed $N2_{ref}$. When it is determined that the output rotational speed N2 falls within the predetermined range, the FF compensation switching portion 64 outputs the FF compensation amount, obtained by the FF compensation unit 63, to the adder-subtracter 69 in order to execute the FF compensation. On the other hand, when it is determined that the output rotational speed N2 does not fall within the predetermined range, the FF compensation switching portion 64 outputs zero to the adder-subtracter 69 in order to stop the FF compensation. The adder-subtracter 69 adds the FF correction amount to the stroke amount command value $LVDT_{ref}$ to obtain the corrected stroke amount command value $LVDT_{ref}$. Thus, the FF compensation unit 63 calculates the FF correction amount based on various signals and input values to realize a state in which the FF compensation is executable, and the FF compensation switching portion 64 switches between the execution and stop of the FF compensation. To be specific, when the FF compensation switching portion 64 executes the FF compensation, the controller 4 executes the feedforward control with respect to the output rotational speed N2 in order to suppress the influence of the fluctuation of the electric power load.

A stroke amount estimated value $LVDT_{obs}$ that is an estimated actual stroke amount output from the observer 66 described later in detail is input to the adder-subtracter 69, and the adder-subtracter 69 calculates a stroke amount difference $\Delta LVDT(=LVDT_{ref}-LVDT_{obs})$ by subtracting the stroke amount estimated value $LVDT_{obs}$ from the stroke amount command value $LVDT_{ref}$ to which the FF correction amount is added. The obtained stroke amount difference $\Delta LVDT$ is output from the adder-subtracter 69 to the valve opening degree command value calculation portion 65.

In order to set the output rotational speed N2 to the target rotational speed $N2_{ref}$, the valve opening degree command value calculation portion 65 calculates the valve opening degree command value $I_{ref}$ to be input to the direction switching valve 30. More specifically, the valve opening degree command value calculation portion 65 includes a command converting portion 86 and a limiter 87. The command converting portion 86 is a so-called coefficient unit. The command converting portion 86 converts the stroke amount difference $\Delta LVDT$ into the valve opening degree command value $I_{ref}$ by multiplying the stroke amount difference $\Delta LVDT$ by a proportional gain $K_{p2}$. The obtained valve opening degree command value $I_{ref}$ is limited to an upper limit or less and a lower limit or more by the limiter 87 and is then output to the transmission 2, more specifically to the electromagnetic driving mechanism 42 of the direction switching valve 30. With this, the flow of the pressure oil to the piston rods 38 and 39 is switched by the direction switching valve 30 to the flow corresponding to the valve opening degree command value $I_{ref}$, and the speed change ratio SR is adjusted such that the output rotational speed N2 becomes equal to the target rotational speed $N2_{set}$. Further, the valve opening degree command value $I_{ref}$ is input to the observer 66 in order to estimate the stroke amounts of the piston rods 38 and 39 after the piston rods 38 and 39 are controlled. Further, an estimated tilting angle $\phi_{est}$ is also input to the observer 66 from an estimated tilting angle calculation portion 88.

The estimated tilting angle calculation portion 88 estimates the tilting angle $\phi$ of the power roller 21d based on the speed change ratio SR output from the speed change ratio calculation portion 60. Specifically, the estimated tilting angle calculation portion 88 calculates the estimated tilting angle $\phi_{est}$ based on the speed change ratio SR output from the speed change ratio calculation portion 60 by using an inverse function $f^{-1}(\phi)$ that is an inverse function of a function $f(\phi)$ indicating a relation of the speed change ratio SR with respect to the tilting angle $\phi$ of the power roller 21d. The obtained estimated tilting angle $\phi_{est}$ is input to the observer 66 together with the valve opening degree command value $I_{ref}$. The observer 66 prepares a numerical model of the transmission 2, estimates the stroke amounts of the piston rods 38 and 39 based on the numerical model, the valve opening degree command value $I_{ref}$, and the estimated tilting angle $\phi_{est}$, and outputs the obtained stroke amount estimated value $LVDT_{obs}$ to the adder-subtracter 69. As described above, the adder-subtracter 69 calculates the stroke amount difference $\Delta LVDT$ based on the stroke amount estimated value $LVDT_{obs}$, the stroke amount command value $LVDT_{ref}$ and the FF correction amount, and the valve opening degree command value calculation portion 65 calculates the valve opening degree command value $I_{ref}$ based on the stroke amount difference $\Delta LVDT$. The obtained valve opening degree command value $I_{ref}$ is input to the electromagnetic driving mechanism 42 of the direction switching valve 30, and with this, the output rotational speed N2 becomes equal to the target rotational speed $N2_{ref}$.

In the controller 4 having such functions, the speed change ratio calculation portion 60, the target speed change ratio calculation portion 61, the PI control unit 62, the valve opening degree command value calculation portion 65, the observer 66, the speed change ratio subtracter 68, the adder-subtracter 69, and the like constitute a feedback control portion 70. In order to maintain the output rotational speed N2 at the target rotational speed $N2_{ref}$, the feedback control portion 70 executes the feedback control by using the stroke amount estimated value $LVDT_{obs}$ of the observer 66. As described above, the controller 4 executes the feedforward control by the FF compensation unit 63. Thus, the output rotational speed N2 is maintained at the target rotational speed $N2_{ref}$ by the feedforward control and the feedback control.

In the power generation system 1 configured as above, when the engine E drives, the rotational driving force is transmitted to the power generator 3 through the transmission 2 to drive the power generator 3. Immediately after the start of the driving, the controller 4 executes the feedback control by the feedback control portion 70 and increases the speed change ratio SR of the transmission 2 to make the output rotational speed N2 approach the target rotational speed $N_{2ref}$. On the other hand, when the feedforward control is executed in a case where the rotational frequency of the power generator 3 is quickly increased to the target rotational speed $N2_{set}$ immediately after the start of the driving, the increase in the rotational frequency of the power generator 3 may slow down by the feedforward control. In view of this, when the output rotational speed N2 is less than $N2_{ref}$-$\alpha$, the controller 4 does not execute the feedforward control by making the FF compensation switching portion 64 set the FF compensation amount to zero. With this, when the rotational frequency is required to be quickly increased to the target rotational speed $N2_{set}$, for example, immediately after the start of the driving, the rotational frequency of the power generator 3 can be increased more quickly than a case where the feedforward control is executed.

Figure 10:
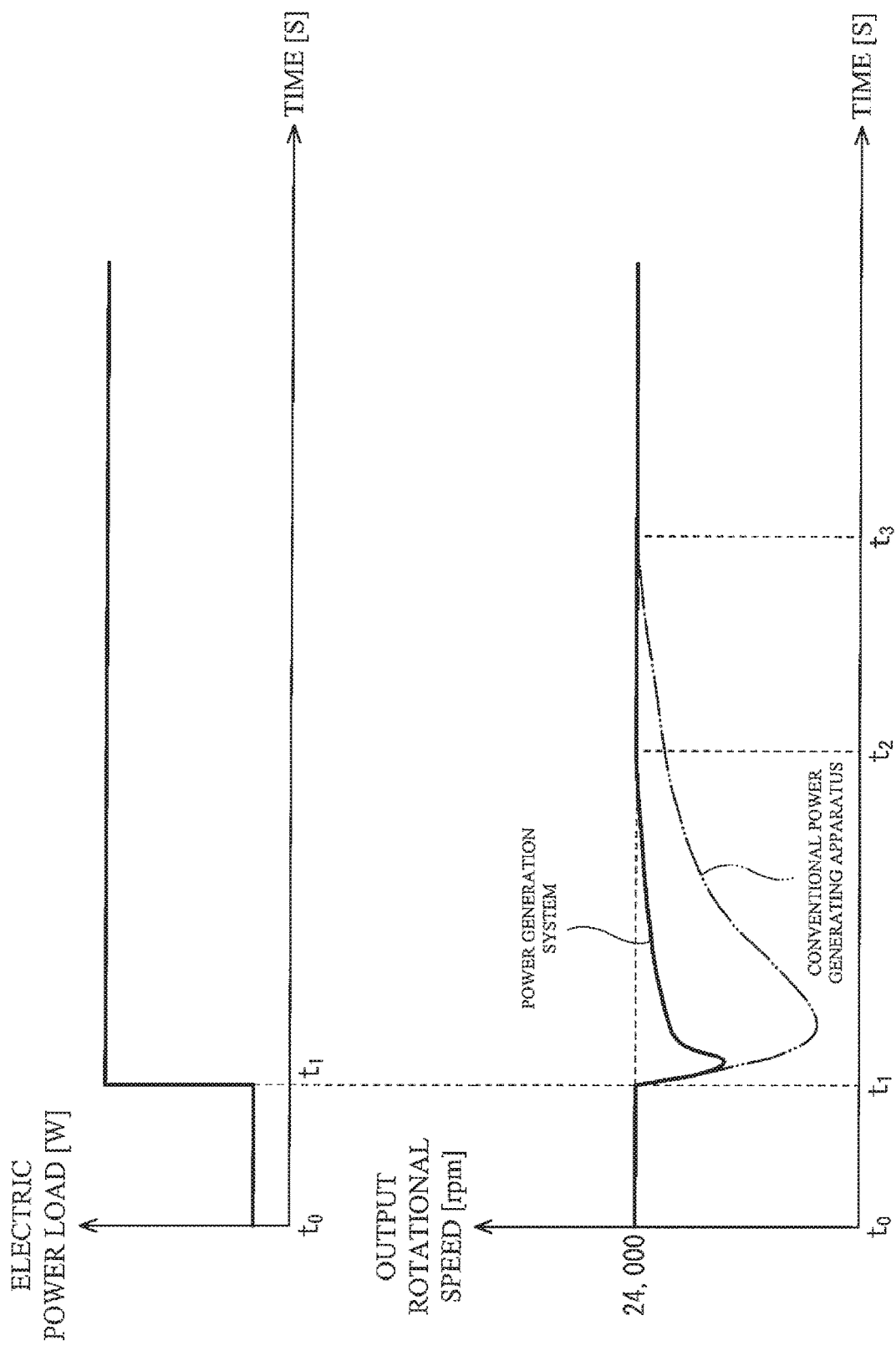
FIG. 10 is a graph showing load power of the power generation system of FIG. 1 and a time-lapse change of a frequency of alternating current.

After that, when the output rotational speed N2 exceeds $N2_{ref}$-$\alpha$, the controller 4 executes the feedforward control in addition to the feedback control. In the feedforward control of the controller 4, the FF correction amount is changed in accordance with the electric power load of the power generator 3. To be specific, as shown in FIG. 10, when the load 7 is not operating (see times $t_0$ to $t_1$), the stroke amount command value $LVDT_{ref}$ is corrected little. On the other hand, as shown in FIG. 10, when the load 7 operates, and large electric power load is applied to the power generator 3 (time $t_1$), the stroke amount command value $LVDT_{ref}$ is significantly corrected. With this, the electric power load received by the power generator 3 increases, and the output rotational speed N2 of the power generator 3 decreases.

However, the amount of decrease of the output rotational speed N2 can be suppressed by executing the feedforward control (see a graph of the output rotational speed in FIG. 10).

Further, the power generation system 1 can suppress the amount of decrease of the output rotational speed N2 more than a power generating apparatus of conventional art (see a solid line and a two-dot chain line in FIG. 10). To be specific, according to the power generation system 1 and the power generating apparatus of the conventional art, in the controller 4 and the transmission 2, the feedforward control sensitively reacts to the fluctuation of the electric power load. Therefore, when the higher harmonic is contained in the electric power load, the excessive FF compensation may be executed due to the higher harmonic, and the frequency generated by the power generator 3 may not fall within a desired range. However, according to the power generation system 1, when calculating the electric power load LOAD to which the FF compensation unit 63 refers, the filtering work of attenuating the higher harmonic is executed by the calculator 16. Therefore, the FF compensation unit 63 can calculate the FF compensation based on the electric power load LOAD which does not contain the higher harmonic. With this, the excessive FF compensation can be prevented from being executed in the feedforward control performed by the controller 4. Thus, the speed change ratio SR of the toroidal CVT 21 can be stably controlled, and as shown in FIG. 10, the decrease in the output rotational speed N2 immediately after the start of the operation of the load 7 can be suppressed.

The calculation device 5 of the power generation system 1 executes the filtering work with respect to the load voltage values $V_A$, $V_B$, and $V_C$ of the respective phases and the load current values $I_A$, $I_B$, and $I_C$ of the respective phases by the pre-filter 17 to attenuate the second higher harmonic. Therefore, the higher harmonic can be prevented from appearing in the obtained electric power load LOAD. Further, the calculation device 5 of the power generation system 1 executes the filtering work with respect to the obtained electric power load LOAD by the post-filter 19 to attenuate the higher harmonic. With this, the higher harmonic can be prevented from appearing in the electric power load LOAD.

When calculating the FF compensation, the filtering work by the conversion into the speed value is executed by the pseudo differential unit 77 and the dead zone filter 78 in the FF compensation unit 63 of the controller 4. Therefore, when the electric power load LOAD contains the high frequency, noise remains even after the filtering by the dead zone filter 78, and the excessive feedforward compensation may be executed. However, when the calculation device 5 calculates the electric power load LOAD, the controller 4 attenuates the high frequency. Therefore, noise can be adequately attenuated by the dead zone filter 78 after the conversion into the speed value, and therefore, the excessive feedforward compensation (i.e., excessive correction) can be prevented from being executed.

Other Embodiments

According to the power generation system 1 of the present embodiment, the stroke correction amount calculation portion 76 of the FF compensation unit 63 calculates the stroke correction amount in accordance with the electric power load LOAD. However, the value to be referred to is not limited to the electric power load LOAD. For example, a mechanical factor (such as bending of the power roller 21d) in the toroidal CVT 21 may be referred to. It should be noted that the bending of the power roller 21d can be obtained by detecting clamping force of the clamp mechanism 23 and referring to the clamping force. The decrease of the output rotational speed N2 can be further suppressed by also referring to the mechanical factor in the toroidal CVT 21 as above.

Further, in the power generation system 1 of the present embodiment, various control blocks for executing the feedforward control and feedback control of the controller 4 shown in FIG. 1 are just examples, and the present embodiment is not necessarily limited to such combination of the control blocks. For example, the stroke correction amount calculation portion 76 may refer to the speed change ratio SR calculated by the speed change ratio calculation portion 60 instead of the input rotational speed N1. In this case, the stroke correction amount calculation portion 76 calculates the correction estimated command value $LVDT_{est}$ by using the speed change ratio SR calculated by the speed change ratio calculation portion 60, the electric power load LOAD, and the prestored table 84.

The present embodiment has described a case where the power generation system 1 is applied to the engine E of the aircraft. However, the apparatus to which the power generation system 1 is applied is not limited to this. To be specific, the power generation system 1 may be applied to engines of cars and engines of various industrial machines, and the apparatus to which the power generation system 1 is not limited. The power generation system 1 shows especially excellent operational advantages when applied to apparatuses, such as aircrafts, in which the power generator 3 is required to generate AC power of a high frequency. In the power generation system 1 of the present embodiment, the toroidal CVT 21 is a central input type but may be a central output type. The toroidal CVT 21 is a double cavity type and a half toroidal type but may be a single cavity type and a full toroidal type. The system to which the calculation device 5 is applied is not limited to the power generation system and is only required to be a system which refers to electric power load and executes control, such as feedforward control.

REFERENCE SIGNS LIST

- 1 power generation system
- 3 power generator
- 4 controller
- 5 calculation device
- 12 output-side rotation sensor
- 14 voltage sensor
- 15 current sensor
- 16 calculator
- 17 pre-filter
- 18 calculation portion
- 19 post-filter
- 21 toroidal CVT
- 21e output shaft
- 22 transmission driving mechanism
- 63 FF compensation unit
- 70 feedback control portion
- 77 pseudo differential unit
- 78 dead zone filter
- 79 phase compensation portion
- 80 gain adjusting portion

The invention claimed is:

1. A power generation system comprising:
   a continuously variable transmission including a transmission mechanism configured to steplessly change a speed change ratio, the continuously variable transmission being configured to transmit a rotational speed of an input shaft to an output shaft at the speed change ratio changed by the transmission mechanism;
   a power generator driven by rotation of the output shaft to generate three-phase AC power;
   a transmission driving device configured to drive the transmission mechanism such that the speed change ratio of the continuously variable transmission is changed to a commanded gear change value corresponding to an input gear change command;
   an output-side speed detector configured to detect an output-side rotational speed that is a rotational speed of the output shaft;
   an electric power load calculation device configured to calculate electric power load of the power generator; and
   a controller configured to output the gear change command corresponding to a detection result of the output-side speed detector and the electric power load calculated by the electric power load calculation device, control the speed change ratio of the continuously variable transmission, and make the power generator generate the three-phase AC power of a predetermined set frequency, wherein:
   the electric power load calculation device includes a current detector, a voltage detector, and a calculator;
   the current detector detects current values of respective phases of a three-phase alternating current generated by the power generator;
   the voltage detector detects voltage values of the respective phases of the three-phase alternating current generated by the power generator;
   the calculator calculates the electric power load of the power generator based on the current values detected by the current detector and the voltage values detected by the voltage detector, and executes filtering work of attenuating a higher harmonic of the set frequency when calculating the electric power load of the power generator;
   the controller includes a feedback control portion and a feedforward compensation portion;
   the feedback control portion executes feedback control of calculating the gear change command and outputting the obtained gear change command to the transmission driving device such that the output-side rotational speed detected by the output-side speed detector becomes equal to an output-side target rotational speed corresponding to the set frequency; and
   the feedforward compensation portion executes feedforward compensation of correcting the gear change command, calculated by the feedback control portion, based on the electric power load of the power generator, the electric power load being calculated by the calculator.

2. The power generation system according to claim 1, wherein:
   the calculator includes a pre-filter; and
   before the electric power load is calculated, the pre-filter executes filtering work of attenuating the higher harmonic of the set frequency with respect to the detected current values of three phases and the detected current values of the three phases.

3. The power generation system according to claim 2, wherein:
   the calculator includes a post-filter; and
   the post-filter executes filtering work of attenuating the higher harmonic of the set frequency with respect to the calculated electric power load.

4. The power generation system according to claim 1, wherein:
   the calculator includes a post-filter; and
   the post-filter executes filtering work of attenuating the higher harmonic of the set frequency with respect to the calculated electric power load.

5. The power generation system according to claim 4, wherein the post-filter includes:
- a band elimination filter configured to attenuate a second higher harmonic of the set frequency; and
- a low pass filter configured to attenuate an N-th higher harmonic (N=3, 4, . . . ) of the set frequency.

6. The power generation system according to claim 5, wherein:
- the feedforward compensation portion executes filtering work of
  - converting the electric power load calculated by the electric power load calculation device into a speed value,
- subjecting the converted electric power load as the speed value to phase compensation through a dead zone filter, and
- integrating the compensated electric power load; and
- the feedforward compensation portion corrects the gear change command, calculated by the feedback control portion, by using as a compensation value the electric power load subjected to the filtering work.

7. A method of controlling a power generation system in which:
- a power generator is driven to generate three-phase AC power by rotation of an output shaft of a continuously variable transmission including a transmission mechanism configured to steplessly change a speed change ratio of the output shaft to an input shaft; and
- a transmission driving device drives the transmission mechanism such that the speed change ratio of the continuously variable transmission is changed to a commanded gear change value corresponding to an input gear change command,
- the power generation system being configured to make the power generator generate the three-phase AC power of a predetermined set frequency, the method comprising:
- a current detecting step of detecting current values of respective phases of a three-phase alternating current generated by the power generator;
- a voltage detecting step of detecting voltage values of the respective phases of the three-phase alternating current generated by the power generator;
- a calculating step of calculating electric power load of the power generator based on the current values detected in the current detecting step and the voltage values detected in the voltage detecting step and executing filtering work of attenuating a higher harmonic of the set frequency when calculating the electric power load of the power generator;
- a speed detecting step of detecting an output-side rotational speed that is a rotational speed of the output shaft;
- a feedback control step of executing feedback control of calculating the gear change command and outputting the obtained gear change command to the transmission driving device such that the output-side rotational speed detected in the speed detecting step becomes equal to an output-side target rotational speed corresponding to the set frequency; and
- a feedforward compensation step of executing feedforward compensation of correcting the gear change command, calculated in the feedback control step, based on the electric power load of the power generator, the electric power load being calculated in the calculating step.

* * * * *